(12) United States Patent
Lei et al.

(10) Patent No.: US 11,681,475 B2
(45) Date of Patent: *Jun. 20, 2023

(54) METHODS, DEVICES, AND A COMPUTER PROGRAM PRODUCT FOR PROCESSING AN ACCESS REQUEST AND UPDATING A STORAGE SYSTEM

(71) Applicant: EMC IP Holding Company LLC, Hopkinton, MA (US)

(72) Inventors: Lu Lei, Shanghai (CN); Ao Sun, Shanghai (CN)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/592,773

(22) Filed: Feb. 4, 2022

(65) Prior Publication Data

US 2022/0156013 A1    May 19, 2022

Related U.S. Application Data

(63) Continuation of application No. 16/508,220, filed on Jul. 10, 2019, now Pat. No. 11,269,548.

(30) Foreign Application Priority Data

Feb. 1, 2019    (CN) .......................... 201910105354.5

(51) Int. Cl.
*G06F 3/06*    (2006.01)
*G06F 9/50*    (2006.01)

(52) U.S. Cl.
CPC .......... *G06F 3/0659* (2013.01); *G06F 3/0604* (2013.01); *G06F 3/0664* (2013.01);
(Continued)

(58) Field of Classification Search
CPC .... G06F 3/0659; G06F 3/0604; G06F 3/0664; G06F 3/0673; G06F 9/5011;
(Continued)

(56) References Cited

U.S. PATENT DOCUMENTS 8,589,659 B1* 11/2013 Shapiro ................. G06F 3/0685
711/216

FOREIGN PATENT DOCUMENTS

CN    103226489    7/2013
CN    105975413    9/2016

OTHER PUBLICATIONS

Office Action dated Feb. 9, 2021 for U.S. Appl. No. 16/508,220, 19 pages.
(Continued)

*Primary Examiner* — David Yi
*Assistant Examiner* — Dustin B. Fulford
(74) *Attorney, Agent, or Firm* — Amin, Turocy & Watson, LLP

(57) ABSTRACT

Techniques for processing an access request and updating a storage system are provided. For instance, a method comprises: receiving an access request for an object associated with a storage system, the storage system including a plurality of physical nodes, each of the plurality of physical nodes including at least one set of virtual units, each set of virtual units including at least one virtual unit; determining, from a plurality of sets of virtual units included in the plurality of physical nodes of the storage system, a target set of virtual units associated with the object; and determining, from the target set of virtual units, a target virtual unit corresponding to the object. With the technical solution of the present disclosure, not only a set of virtual units on a physical node may be easily split and merged, but also huge computing resources that need to be allocated may be saved, (Continued)

so better user experience may be brought about at a lower cost.

20 Claims, 12 Drawing Sheets

(52) U.S. Cl.
CPC .......... *G06F 3/0673* (2013.01); *G06F 9/5011* (2013.01); *G06F 2209/5013* (2013.01)

(58) Field of Classification Search
CPC .. G06F 2209/5013; G06F 3/061; G06F 3/064; G06F 3/067; G06F 16/182; G06F 16/134; G06F 16/137
See application file for complete search history.

(56) References Cited

OTHER PUBLICATIONS

Office Action dated May 11, 2021 for U.S. Appl. No. 16/508,220, 24 pages.
Office Action dated Feb. 18, 2023 for Chinese Patent Application No. 201910105354.5, 8 pages.

\* cited by examiner

METHODS, DEVICES, AND A COMPUTER PROGRAM PRODUCT FOR PROCESSING AN ACCESS REQUEST AND UPDATING A STORAGE SYSTEM

RELATED APPLICATIONS

The subject patent application is a divisional of, and claims priority to each of, U.S. patent application Ser. No. 16/508,220 (now U.S. Pat. No. 11,269,548), filed Jul. 10, 2019, and entitled "METHODS, DEVICES, AND A COMPUTER PROGRAM PRODUCT FOR PROCESSING AN ACCESS REQUEST AND UPDATING A STORAGE SYSTEM," each of which applications claim the benefit of priority to Chinese Patent Application No. 201910105354.5, filed on Feb. 1, 2019, and all of which priority applications are hereby incorporated into the present application by reference herein in their entireties.

FIELD

Embodiments of the present disclosure generally relate to the field of data storage, and more specifically, to methods, devices, and a computer program products for processing an access request and updating a storage system.

BACKGROUND

Elastic Cloud Storage (ECS) is an object storage technology used for distributed storage systems. Traditional storage technologies are usually block storage, that is, a file is divided into blocks. Objects in the distributed storage system comprise users' files, images, videos, etc. The object storage technology treats each file as an individual object and assigns a unique key or file ID. Hence, the file is actually stored as a whole. In the distributed storage system, each object is represented as a <key, value> pair, keyspace is managed using a distributed hash table (DHT, e.g., consistent hashing). One benefit that elastic cloud storage uses consistent hashing is, given P virtual units (also referred to as virtual nodes or partitions) and N physical nodes, as long as P is far larger than N, scale-out/scale-in of the distributed storage system will not involve any data movement.

However, in traditional elastic cloud storage, each virtual unit in the distributed storage system is not only used for data storage but also used for data processing (including data calculation, etc.), and hence will be assigned computing resources. Such wide allocation of computing resources places great computing load pressure on physical nodes. In addition, when N is larger than P in the distributed storage system, existing virtual units need to be split so as to form new virtual units, at which point <key, value> pairs representing objects need to be re-calculated and re-stored. Since the data volume in the distributed storage system might amount to several PBs, and there might be millions of <key, value> pairs, re-calculation and re-storage will cause huge overhead. Furthermore, if there are too many virtual units in the distributed storage system, then physical nodes need to allocate enormous computing resources, so physical nodes are put under a heavy computing resource burden.

SUMMARY

Embodiments of the present disclosure provide methods, devices and computer program products for updating an access request and updating a storage system.

In a first aspect of the present disclosure, provided is a method for processing an access request. The method comprises: receiving an access request for an object associated with a storage system, the storage system including a plurality of physical nodes, each of the plurality of physical nodes including at least one set of virtual units, each set of virtual units including at least one virtual unit; determining, from a plurality of sets of virtual units included in the plurality of physical nodes of the storage system, a target set of virtual units associated with the object; and determining, from the target set of virtual units, a target virtual unit corresponding to the object.

In a second aspect of the present disclosure, provided is a method for updating a storage system. The method comprises: in response to detecting an update event associated with the storage system, obtaining information on sets of virtual units in a plurality of physical nodes included in the storage system, each set of virtual units including at least one virtual unit; and updating the storage system based on the obtained information.

In a third aspect of the present disclosure, provided is a device for processing an access request. The device comprises: at least one processing unit; at least one memory coupled to the at least one processing unit and storing instructions to be executed by the at least one processing unit, the instructions, when being executed by the at least one processing unit, causing the device to perform acts comprising: receiving an access request for an object associated with a storage system, the storage system including a plurality of physical nodes, each of the plurality of physical nodes including at least one set of virtual units, each set of virtual units including at least one virtual unit; determining, from a plurality of sets of virtual units included in the plurality of physical nodes of the storage system, a target set of virtual units associated with the object; and determining, from the target set of virtual units, a target virtual unit corresponding to the object.

In a fourth aspect of the present disclosure, provided is a device for updating a storage system. The device comprises: at least one processing unit; at least one memory coupled to the at least one processing unit and storing instructions to be executed by the at least one processing unit, the instructions, when being executed by the at least one processing unit, causing the device to perform acts comprising: in response to detecting an update event associated with the storage system, obtaining information on sets of virtual units in a plurality of physical nodes included in the storage system, each set of virtual units including at least one virtual unit; and updating the storage system based on the obtained information.

In a fifth aspect of the present disclosure, provided is a computer program product. The computer program product is tangibly stored on a non-transient computer readable medium and comprising machine executable instructions which, when being executed, causing a machine to perform steps of the method according to the first aspect or the second aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the more detailed description of example embodiments of the present disclosure with reference to the accompanying drawings, the above and other objects, features and advantages of the present disclosure will become more apparent, wherein the same reference numerals typically represent the same components in the example embodiments of the present disclosure.

Throughout the figures, the same or corresponding numerals denote the same or corresponding parts.

DETAILED DESCRIPTION OF EMBODIMENTS

Various embodiments will be described in more detail with reference to the accompanying drawings, in which the preferable embodiments of the present disclosure have been illustrated. However, the present disclosure can be implemented in various manners, and thus should not be construed to be limited to embodiments disclosed herein. On the contrary, those embodiments are provided for the thorough and complete understanding of the present disclosure, and completely conveying the scope of the present disclosure to those skilled in the art.

The terms "comprise" and its variants used here are to be read as open terms that mean "include, but is not limited to." Unless otherwise specified, the term "or" is to be read as "and/or." The term "based on" is to be read as "based at least in part on". The terms "one example embodiment" and "one embodiment" are to be read as "at least one embodiment." The term "another embodiment" is to be read as "at least one other embodiment." The terms "first," "second" and the like may refer to different or the same objects. Other definitions, explicit and implicit, might be included below.

As described in the BACKGROUND, traditional elastic cloud storage not only places great computing load pressure on physical nodes but also might cause huge system overhead due to splitting virtual units.

Figure 1:
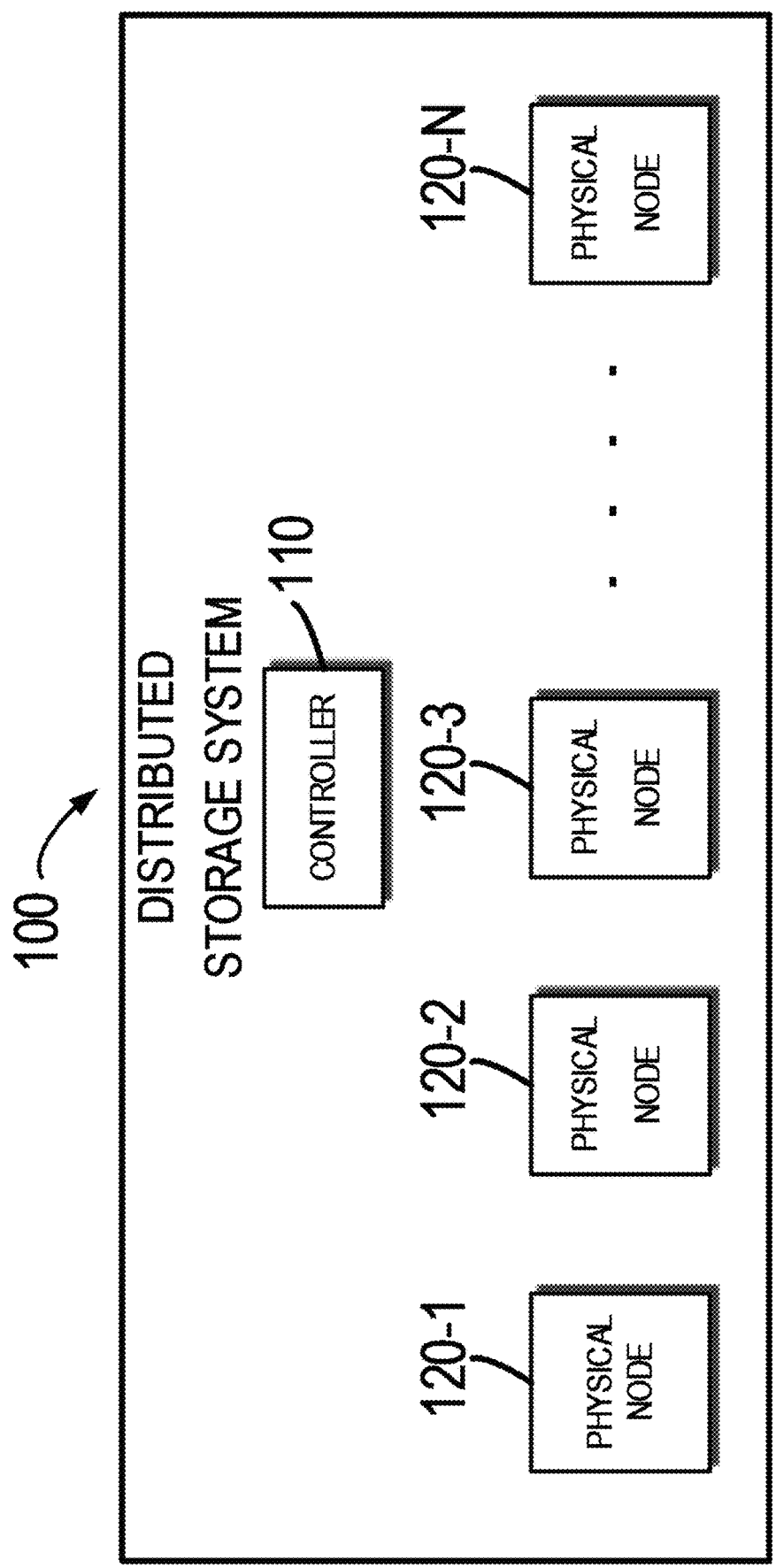
FIG. 1 shows a schematic view of a storage system 100 in traditional solutions.

FIG. 1 shows a schematic view of a storage system 100 in a traditional solution, wherein the storage system 100 is a distributed storage system for example. Meanwhile, the storage system 100 as depicted is also applicable to embodiments of the present disclosure.

The storage system 100 as shown in FIG. 1 comprises: a controller 110; and N physical nodes 120-1, 120-2, 120-3, . . . 120-N (collectively referred to as physical node 120). The controller 110 may represent the control functionality running on an operating system of the physical node 120 in the storage system 100, which is used to control various operations in the storage system 100. The physical node 120 may be a physical machine or a virtual machine, which is used to carry a virtual node of the storage system 100 so as to store an object. Meanwhile, the operating system of the physical node 120 may be used to run various elastic cloud storage components.

Figure 2:
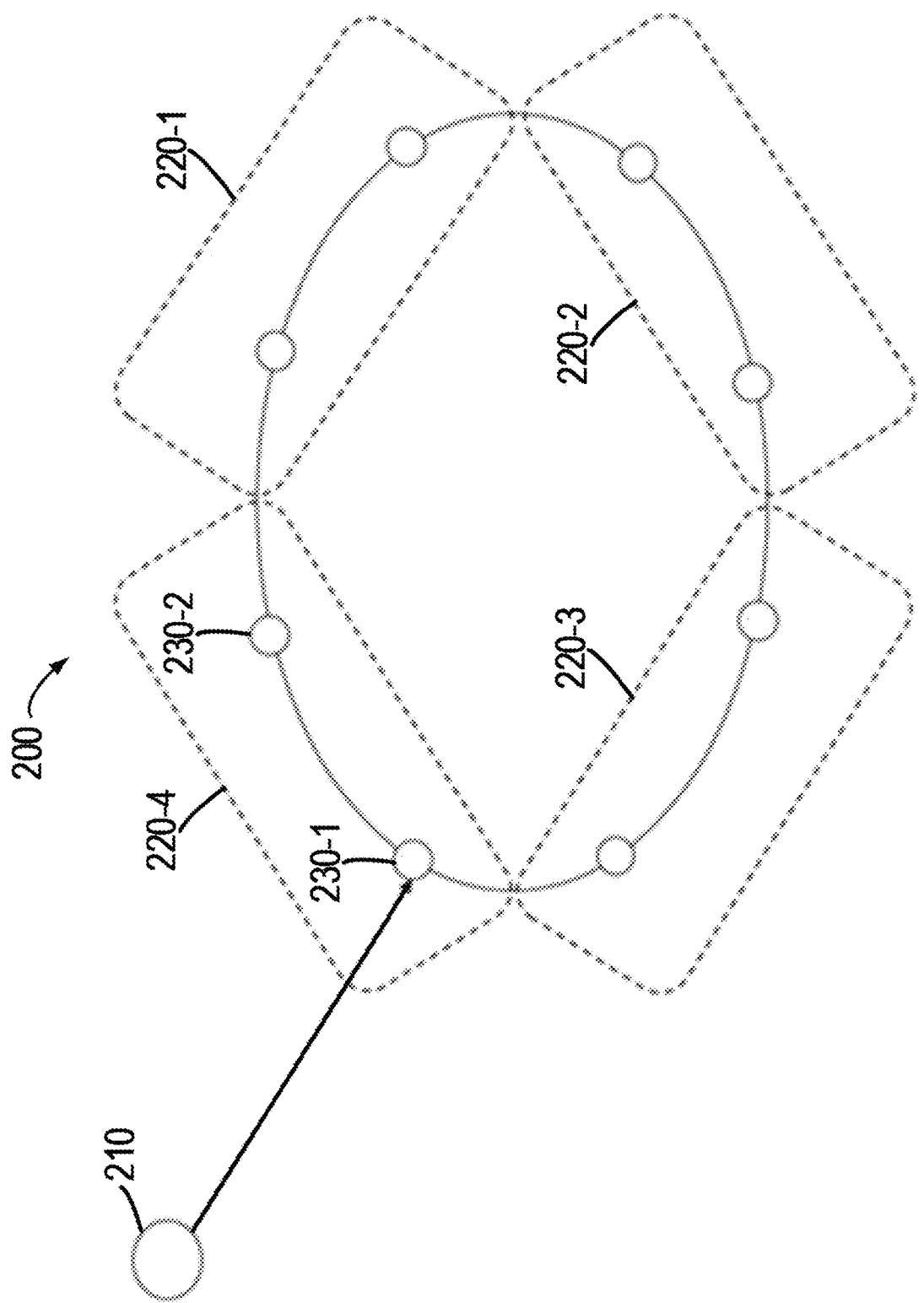
FIG. 2 shows a schematic view of a storage system solution 200 in traditional solutions.

FIG. 2 shows a schematic view of a storage system solution 200 among traditional solutions, the storage system solution 200 comprising four physical nodes and eight virtual units. The storage system solution 200 as shown in FIG. 2 comprises four physical nodes 220-1, 220-2, 220-3 and 220-4 (collectively referred to as physical node 220). Each physical node in the storage system solution 200 comprises two virtual units, wherein the physical node 220-4 comprises virtual units 230-1 and 230-2. If the calculation of each virtual unit needs, e.g., 100 threads, then each physical node will be assigned 200 computing threads during initialization, as each physical node comprises two virtual units.

In traditional solutions, when objects are put to a storage system using the elastic cloud storage technology, the elastic cloud storage technology will generate a unique 64-bit object ID for each object as the key, persist object user data to physical disks with distributed protection and generate, for user data, user data persistence information which is used to record storage locations of user data, construct user metadata together with user data persistence information as the value, and persist objects' <key, value> pairs into a distributed hash table. It can be seen that metadata of all objects in the storage system are stored as <key, value> pairs in the distributed hash table, which form the distributed hash table for object keyspace of the storage system.

Although FIG. 2 shows the storage system solution 200 that comprises four physical nodes and eight virtual units, typically the elastic cloud storage technology configures 128 virtual units for the distributed hash table, wherein each virtual unit manages a portion of the object keyspace. For each object, it is determined by consistent hashing of the object's key to which virtual unit in the storage system the object belongs.

Still refer to FIG. 2. When the object 210 in FIG. 2 needs to be put into a virtual unit, first of all, the key of the object 210 is subjected to consistent hashing (e.g., modulus). In the example shown in FIG. 2, suppose consistent hashing on the key of the object 210 results in 6, this means the object 210 corresponds to a virtual unit "6." In the example shown in FIG. 2m suppose the virtual unit 230-1 is the virtual unit "6," then the object 210 (<key, value> pair of the object 210) will be directed to the virtual unit "6" on the physical node 220-4 and further stored therein. It is noteworthy that the keyspace calculation for the object 210 is also performed in the virtual unit by using 100 calculating threads allocated to the virtual unit "6."

Sometimes the storage system needs to be updated, wherein the updating may comprise adding a physical node to or removing a physical not from the storage system. For example, when adding a physical node to the storage system solution 200 shown in FIG. 2, the number of physical nodes after the adding may change to six, eight or more, wherein an example that the number of physical nodes becomes eight after the adding will be shown in FIG. 3.

Figure 3:
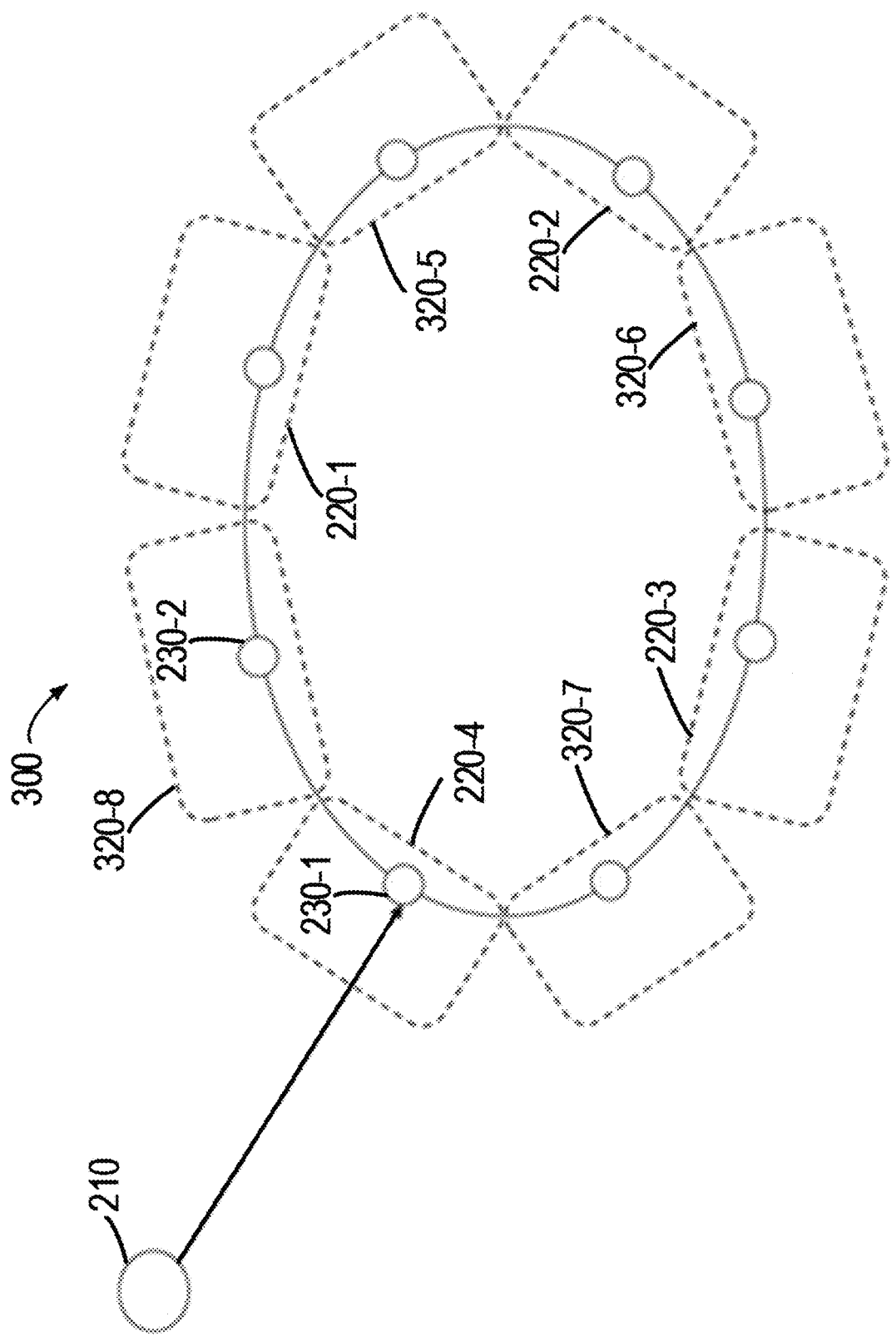
FIG. 3 shows a schematic view of a storage system solution 300 in traditional solutions.

FIG. 3 shows a schematic view of a storage system solution 300 among traditional solutions, wherein the storage system solution 300 comprises eight physical nodes and eight virtual units. The storage system solution 300 as shown in FIG. 3 comprises eight physical nodes 220-1, 220-2, 220-3, 220-4 (which four also exist in the storage system solution 200 shown in FIGS. 2), 320-5, 320-6, 320-7 and 320-8. Each physical node in the storage system solution 300 comprises one virtual unit, wherein the physical node 220-4 comprises a virtual unit 230-1, while the virtual unit 230-2 that used to be included in the physical not 220-4 in the storage system solution 200 shown in FIG. 2 is now included in the physical node 320-8.

It should be understood regarding the storage system solution 300 comprising eight physical nodes and eight virtual units as shown in FIG. 3, when physical nodes need to be removed from the storage system so that the storage system can be restored to the storage system solution 200 shown in FIG. 2, half (four) the storage units shown in FIG. 3 may be re-mapped to the remaining four physical nodes easily. However, if more physical nodes want to be added to the storage system solution 300 shown in FIG. 3, then an overhead problem will arise, because all above is based on an assumption that P is larger than N, wherein P may be deemed as the upper limit of scalability in the storage system solution. If N is larger than P and no virtual unit is split, then only P out of N nodes own partitions while the remaining (N-P) nodes would be free.

Take the storage system solution 300 shown in FIG. 3 as an example. If physical nodes further expand to more than eight and no virtual unit is split, then some physical nodes do not include any virtual units and thus are idling. With the elastic cloud storage technology, nowadays there exists a big client deploying 160 physical nodes per storage system. At this point, suppose at most T client requests can be processed per physical node, then theoretically 160 physical nodes can process 160T requests. However, since in the traditional solution there are only 128 virtual units by default, this means at most 128 out of 160 physical nodes have virtual units, and the remaining 32 physical nodes will never receive any object-related access request and thus are idling. In addition, the whole storage system can only process 128T requests, so that the virtual unit throughput would be the bottleneck of the storage system. Therefore, such traditional solutions as 128 default virtual units can barely satisfy clients' needs.

At this point, as described above, the traditional solution will re-calculate the hash, obtain a new result by the keyspace in all virtual units in the storage system modula 16 and re-store the result. That is, all stored <key, value> pairs need to be re-calculated and re-stored (data might amount to several PBs and millions of object accounts), which involves keyspace scanning and data movement with huge overhead (huge data volume). Meanwhile, it is hard to ensure the correctness of data entering the storage system when virtual unit splitting is underway. Therefore, virtual unit splitting is rather difficult in traditional solutions.

In addition, when a user only has a low demand for the space of the storage system, if still 128 virtual units are utilized, then a thread needs to be allocated to each virtual unit. If only four physical nodes are utilized and each virtual unit needs 100 threads, then each physical node needs to be assigned 128*100/4=3200 threads, which means a great computing resource burden to the virtual machine.

With reference to FIGS. 1 to 3, traditional storage systems have been described in brief. By referring to FIGS. 4 to 10, a detailed description is presented below to concrete flows and operations of respective flowcharts of a method 400 for processing an access request and a method 600 for updating a storage system according to embodiments of the present disclosure.

To at least partly overcome the above problems in traditional solutions, embodiments of the present disclosure propose a method for processing an access request and a method for updating a storage system. With these methods, dynamic splitting for consistent hashing may be effected using two-level hashing. In these methods, sets of virtual units are utilized. The number (S) of virtual unit units is dynamic instead of being a fixed number. When the cluster expands to N>S, a set of virtual units may be split to generate more sets of virtual units for further avoiding data movement. On the other hand, when the storage system scales in, sets of virtual units may be merged to save the usage of computing resources for each physical nodes, because in embodiments according to the present disclosure, computing resources are allocated to a set of virtual units so as to be shared among all virtual units in the set. With the technical solution of the present disclosure, not only sets of virtual units on physical nodes may be easily split and merged, but also large computing resources that have to be allocated may be saved, and further better user experience may be gained at a lower cost.

Figure 4:
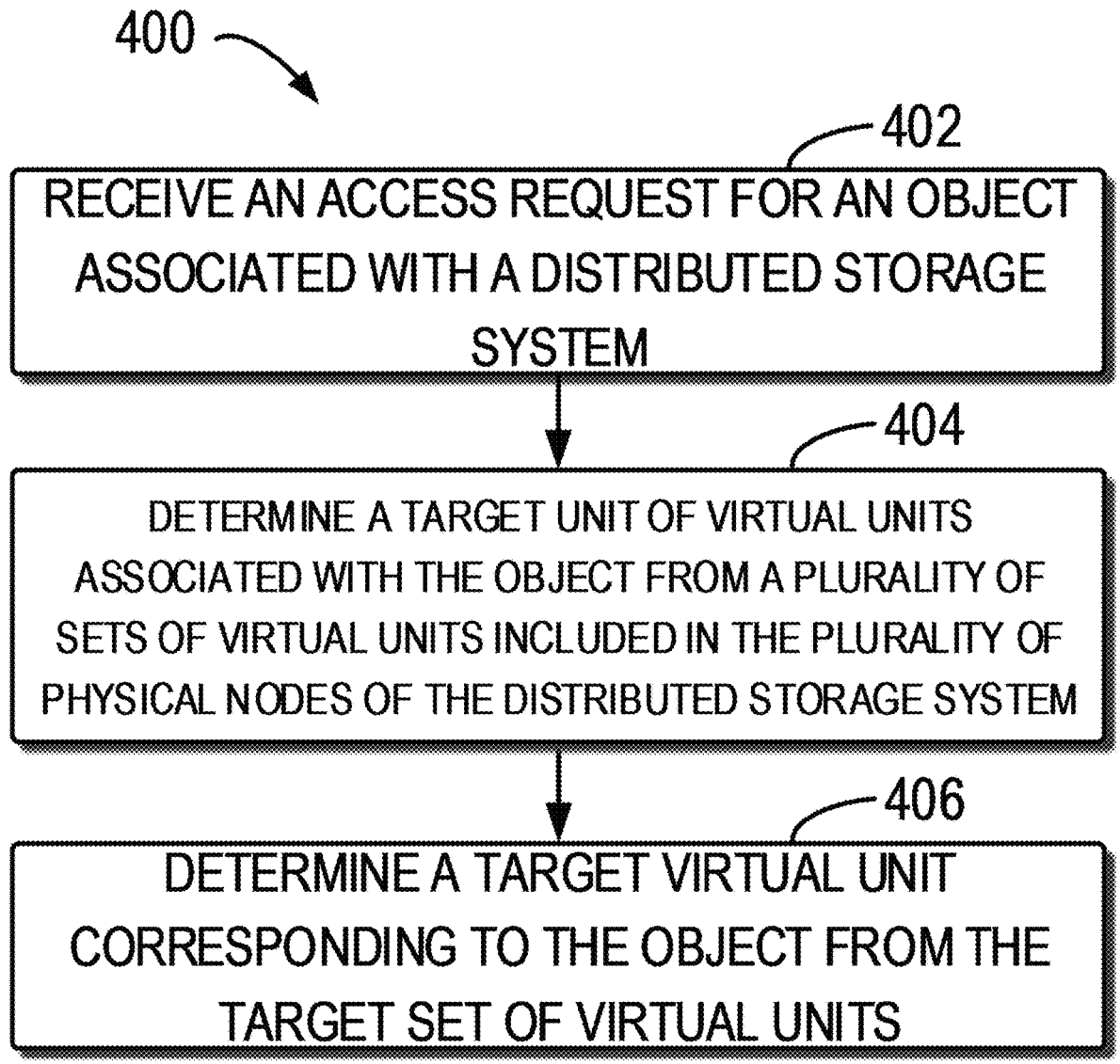
FIG. 4 shows a flowchart of a method 400 for processing an access request according to embodiments of the present disclosure.

FIG. 4 shows a flowchart of a method 400 for processing an access request according to embodiments of the present disclosure. Specifically, the method 400 may be performed by the storage system 100 or other appropriate device. It should be understood the method 400 may further comprise an additional step which is not shown and/or omit a step which is shown, and the scope of the present disclosure is not limited in this regard.

At block 402, the storage system receives an access request for an object associated with the storage system. According to embodiments of the present disclosure, the access request may be an object write request or an object read request, and the storage system comprises a plurality of physical nodes, each physical node comprising at least one set of virtual units, each set of virtual units comprising at least one virtual unit, wherein the number of physical nodes, the number of set of virtual units included in each physical node as well as the number of virtual units included in each set of virtual units may be set by the administrator or automatically generated by the system.

Figure 5:
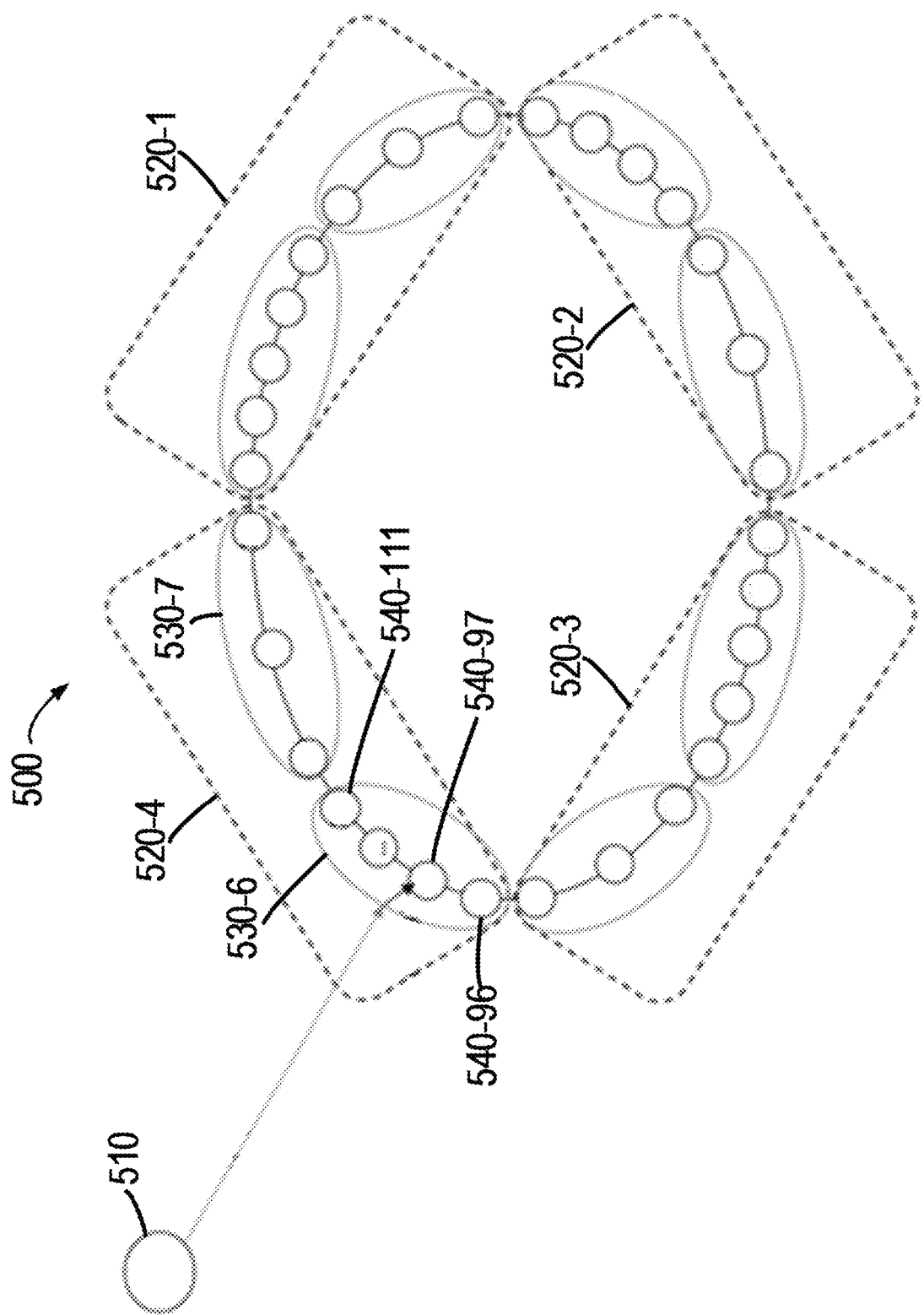
FIG. 5 shows a schematic view of a storage system solution 500 according to embodiments of the present disclosure.

With reference to FIG. 5, a schematic view of a storage system solution 500 according to embodiments of the present disclosure is shown, wherein the storage system solution 500 comprises four physical nodes and eight sets of virtual units may be applicable to the method 400 for processing an access request shown in FIG. 4. The storage system solution 500 as shown in FIG. 5 comprises four physical nodes 520-1, 520-2, 520-3 and 520-4. Each physical node in the storage system solution 500 comprises two sets of virtual units, wherein the physical node 520-4 comprises sets of virtual units 530-6 and 530-7. Each set of virtual units in the storage system solution 500 comprises 16 virtual units, the set of virtual units 530-6 comprising virtual units 540-96, 540-97 to 540-111. Therefore, the storage system solution 500 shown in FIG. 5 comprises a total of 128 virtual units. In addition, an object 510 shown in FIG. 5 is the object associated with the storage system as shown at block 402.

At block 404, the storage system determines a target set of virtual units associated with the object from a plurality of sets of virtual units comprised in the plurality of physical nodes of the storage system. According to embodiments of the present disclosure, the step described at block 404 may be performed, for example, through the following steps with reference to FIG. 5.

As shown in FIG. 5, if the object 510 needs to be put into a virtual unit, the storage system first determines a first identifier of the object 510. According to embodiments of the present disclosure, determining the first identifier of the object 510 may be effected by, for example, obtaining a key (e.g., ID) of the object 510 and performing consistent hashing (e.g., modulus) to the key. In the example shown in FIG. 5, suppose the key of the object 510 results in 6 through consistent hashing, then it may be considered the first identifier of the object 510 is "6."

Afterwards, the storage system determines a plurality of set identifiers of the plurality of sets of virtual units. According to embodiments of the present disclosure, the storage system may determine a set identifier of each set of virtual units, and these set identifiers may be integers increasing from 0.

Next, the storage system determines a set identifier associated with the first identifier of the object 510 from the plurality of set identifiers. In the example shown in FIG. 5, suppose the first identifier of the set of virtual units 530-6 is "6," then this set of virtual units may also be referred to as a set of virtual units "6." At this point, the first identifier "6" of the object 510 is associated with (e.g., same as) the set identifier "6" of the set of virtual units 530-6.

Finally, the storage system determines a set of virtual units (i.e., a set of virtual units 530-6) identified by the associated set identifier "6" as the target set of virtual units. According to embodiments of the present disclosure, from the perspective of the object 510 or the user, the set of virtual units "6" (a target set of virtual units) may be considered same as or equivalent to the virtual unit "6" described with reference to FIG. 2.

Since the following steps are performed through consistent hashing and result in finding the target set of virtual units associated with the object 510 rather than a final target virtual unit, they may be referred to as first-level hashing in the method 400.

At block 406, the storage system determines a target virtual unit corresponding to the object 510 from the target set of virtual units. According to embodiments of the present disclosure, the step described at block 406 may further be performed for example, through the following steps with reference to FIG. 5.

Still suppose the key of the object 510 results in 6 through consistent hashing and the first identifier of the object 510 is "6." Since the storage system has determined the set of virtual units (i.e., a set of virtual units 530-6) identified by the associated set identifier "6" as the target set of virtual units, at this point the storage system will first determine a second identifier of the object 510 based on the first identifier "6." According to embodiments of the present disclosure, determining the second identifier of the object 510 may be effected by, for example, obtaining a key (e.g., ID) of the object 510 and performing consistent hashing (e.g., modulus) to the key and the first identifier "6." In the example shown in FIG. 5, suppose the key of the object 510 and the first identifier "6" result in 97 through consistent hashing, then it may be considered the second identifier of the object 510 is "97."

Afterwards, the storage system determines a virtual unit identifier of each virtual unit in the set of virtual units 530-6. According to embodiments of the present disclosure, the storage system may determine a virtual unit identifier of each virtual unit in the set of virtual units 530-6, and these virtual unit identifiers may be integers from 96 to 111, for example.

Next, the storage system determines a virtual unit identifier corresponding to the identifier of the object 510 from the plurality of virtual unit identifiers. In the example shown in FIG. 5, suppose the virtual unit identifier of the virtual unit 540-97 in the set of virtual units 530-6 is "97," then this virtual unit may also be referred to as virtual unit "97." At this point, the second identifier "97" of the object 510 is corresponding to (e.g., same as) the virtual unit identifier "97" of the virtual unit 540-97.

Finally, the storage system determines a virtual unit (i.e., virtual unit 540-97) identified by the corresponding virtual unit identifier "97" as the target virtual unit.

Since the following steps are also performed through consistent hashing and result in finding the final target virtual unit corresponding to the object 510, they may be referred to as second-level hashing in the method 400. According to embodiments of the present disclosure, second-level hashing is processed within the distributed hash table and is invisible to users of the storage system.

As seen from the foregoing description, first-level hashing may be used to calculate mapping relations between sets of virtual units and physical nodes, and second-level hashing may be used to calculate mapping relations between virtual units and sets of virtual units.

The method 400 for processing an access request may further comprise a step of the storage system allocating a computing resource to the target set of virtual units so as to process the access request. According to embodiments of the present disclosure, the storage system allocates a computing resource to the target set of virtual units rather than the target virtual unit, the computing resource being shared among all virtual units in the target set of virtual units. According to embodiments of the present disclosure, the storage system may allocate computing resources to all sets of virtual units during system building, wherein the storage system may, according to maximum computing resources supported by each physical node, evenly distribute the maximum computing resource to all sets of virtual units comprised in each physical node. Therefore, although the object 510 (<key, value> pair of the object 510) will be directed to the virtual unit 540-97 in the set of virtual units 530-6 on the physical node 520-4 and stored therein, the keyspace calculation for the object 510 is performed in the set of virtual units 530-6 and completed using computing threads (e.g., 100) allocated to the set of virtual units 530-6.

In addition, in response to the access request being a write request or a read request, the method 400 for processing the access request may further comprise a step of the storage system writing the object to (<key, value> pair associated with the object) or reading the object from the target virtual unit.

One advantage of using the method 400 for processing the access request is, though the <key, value> pair also persists in virtual units, computing resource usages are calculated on sets of virtual units. Therefore, under same computing resource limitation, same sets of virtual units can be maintained, but these sets of virtual units will comprise a larger number of virtual units (persistence units). In FIG. 5, the number of sets of virtual units is still eight, while the number of virtual units increases to 128. Although the number 128 of virtual units is still the upper limit of scalability in the storage system, it is no longer limited by computing resources, and a larger number of virtual units than the original number can be arranged more economically and easily.

Figure 6:
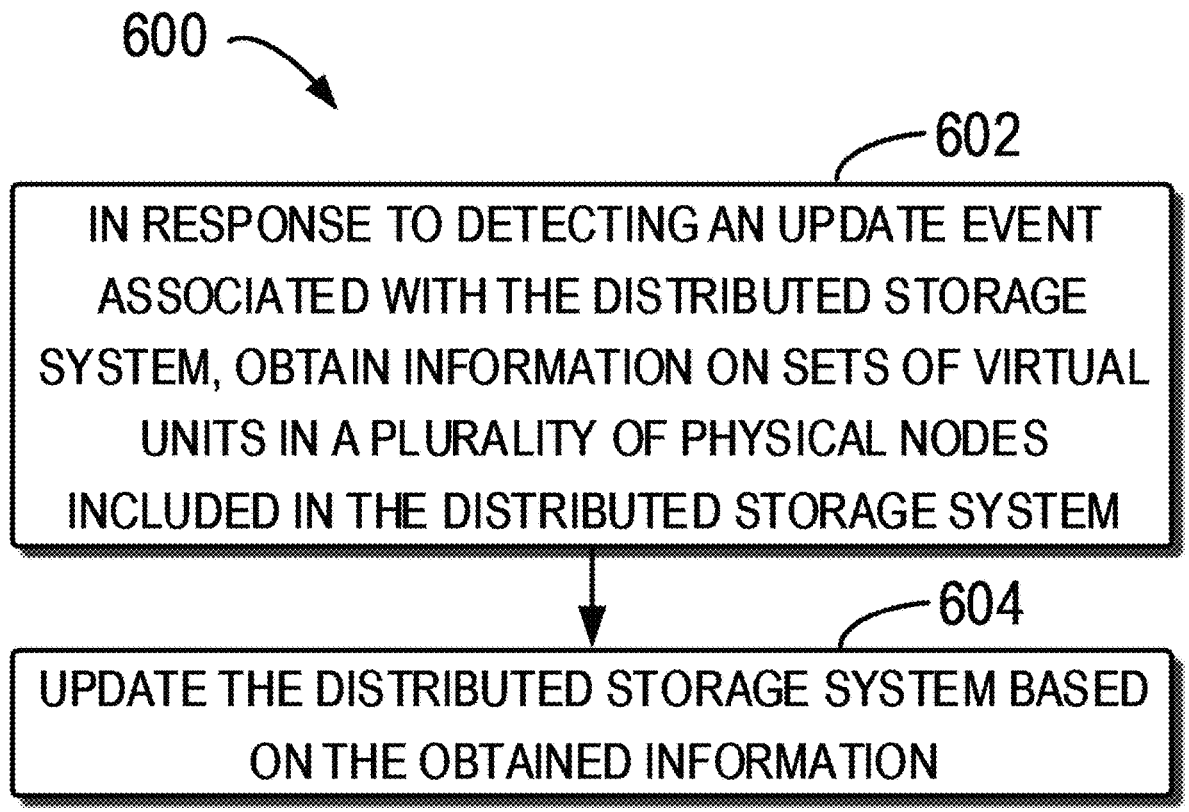
FIG. 6 shows a flowchart of a method 600 for updating a storage system according to embodiments of the present disclosure.

FIG. 6 shows a flowchart of a method 600 for updating a storage system according to embodiments of the present disclosure. Specifically, the method 600 may be performed by the storage system 100 or other appropriate device. It should be understood the method 400 may further comprise an additional step which is not shown and/or omit a step which is shown, and the scope of the present disclosure is not limited in this regard.

At block 602, the storage system obtains information on sets of virtual units in a plurality of physical nodes comprised in the storage system in response to detecting an updating event associated with the storage system. As described above, the storage system comprises a plurality of physical nodes, each physical node comprising at least one set of virtual units, each set of virtual units comprising at least one virtual unit, wherein the number of physical nodes, the number of sets of virtual units included in each physical node as well as the number of virtual units included in each set of virtual units may be set by the administrator or automatically generated by the system. According to embodiments of the present disclosure, the information may comprise information on a physical node where a set of virtual units resides and on virtual units comprised in the set of virtual units.

At block 604, the storage system updates the storage system based on the obtained information. According to embodiments of the present disclosure, the step described at block 604 is implemented accordingly in response to content of the updating event differing.

In response to the updating event being to add a physical node to the storage system, there exist two implementations as below.

In the first implementation, the storage system allocates at least one set of virtual units in the plurality of physical nodes to the added additional physical node based on the information, so that each physical node among the plurality of physical nodes and the additional physical node comprises at least one set of virtual units.

Then, the storage system configures sets of virtual units in the plurality of physical nodes and the additional physical node, so that an object associated with the storage system is uniquely associated with one set of virtual units in the plurality of physical nodes and the additional physical node.

Figure 7:
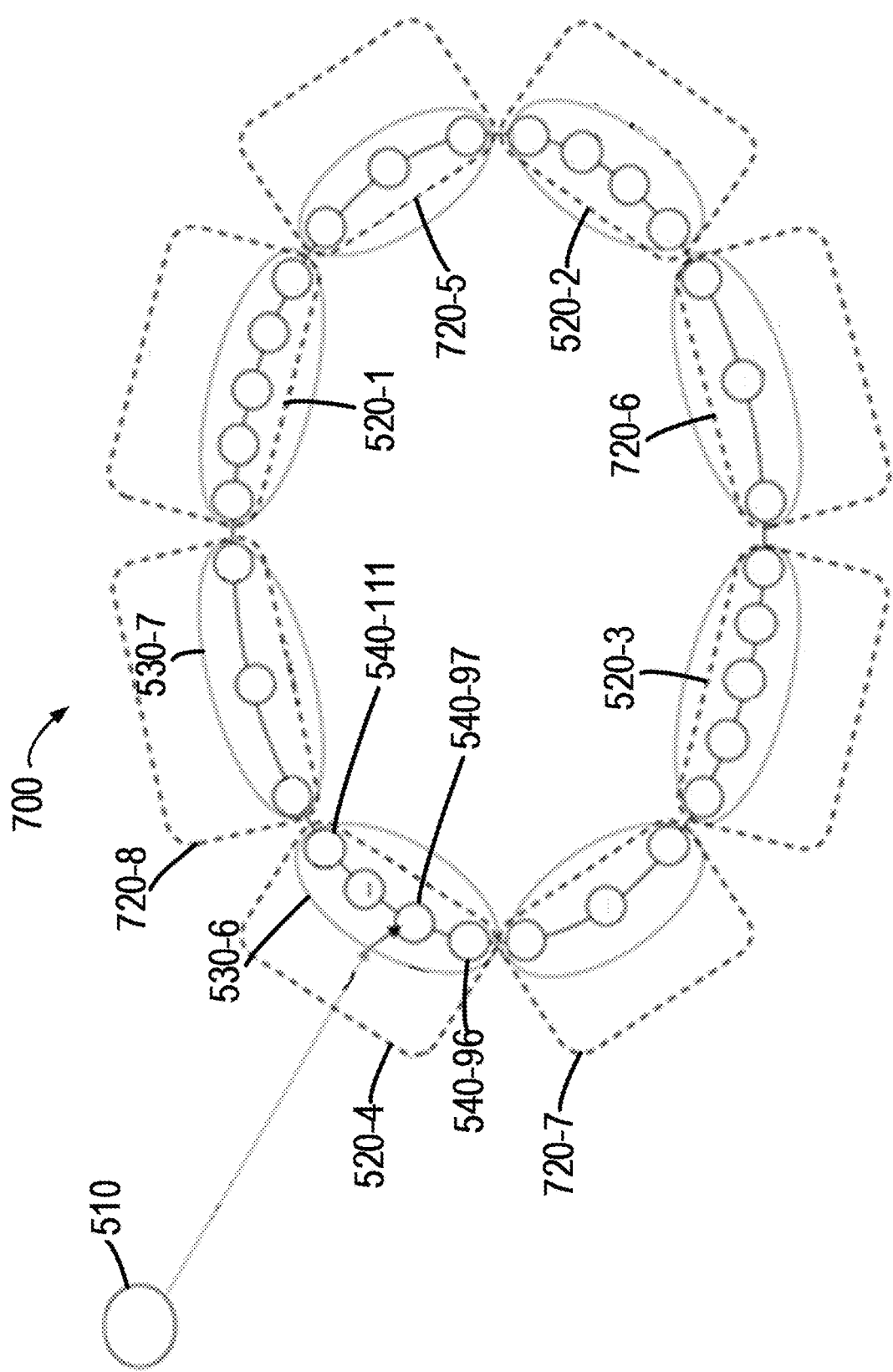
FIG. 7 shows a schematic view of a storage system solution 700 according to embodiments of the present disclosure.

According to embodiments of the present disclosure, the first implementation may be effected on the basis of FIG. 5. The storage system that has been updated through the foregoing steps may be as shown in FIG. 7. With reference to FIG. 7, there is shown a schematic view of a storage system solution 700 according to embodiments of the present disclosure, wherein the storage system solution 700 comprises eight physical nodes and eight sets of virtual units and is applicable to the method 600 for updating a storage system shown in FIG. 6. The storage system solution 700 as shown in FIG. 7 comprises eight physical nodes 520-1, 520-2, 520-3, 520-4 (which four also exist in the storage system solution 500 shown in FIGS. 5), 720-5, 720-6, 720-7 and 720-8. Each physical node in the storage system solution 700 comprises one set of virtual units, wherein the physical node 520-4 comprises a set of virtual units 530-6 and the physical node 720-8 comprises a set of virtual units 530-7 (in the storage system solution 500 shown in FIG. 5, the virtual node set 530-7 is comprised in the physical node 520-4). Each set of virtual units in the storage system solution 700 also comprises 16 virtual units just like the storage system solution 500, wherein the set of virtual units 530-6 comprises virtual units 540-96, 540-97 to 540-111. Therefore, the storage system solution 700 as shown in FIG. 7 also comprises a total of 128 virtual units. In addition, the object 510 shown in FIG. 7 is the object associated with the storage system as shown at block 602.

It should be understood according to embodiments of the present disclosure, the first implementation may be easily performed only by changing the first-level hashing algorithm.

In the second implementations, first of all, the storage system splits one set of virtual units on the plurality of physical nodes into a plurality of new sets of virtual units based on the information.

Next, the storage system allocates at least one new set of virtual units to the additional physical node, so that each physical node among the plurality of physical nodes and the additional physical node comprises at least one of an unsplit set of virtual units and a new set of virtual units.

Finally, the storage system configures the unsplit set of virtual units and the plurality of new sets of virtual units on the plurality of physical nodes and the additional physical node, so that an object associated with the storage system is uniquely associated with one unsplit set of virtual units or one new set of virtual units on the plurality of physical nodes and the additional physical node.

Figure 8:
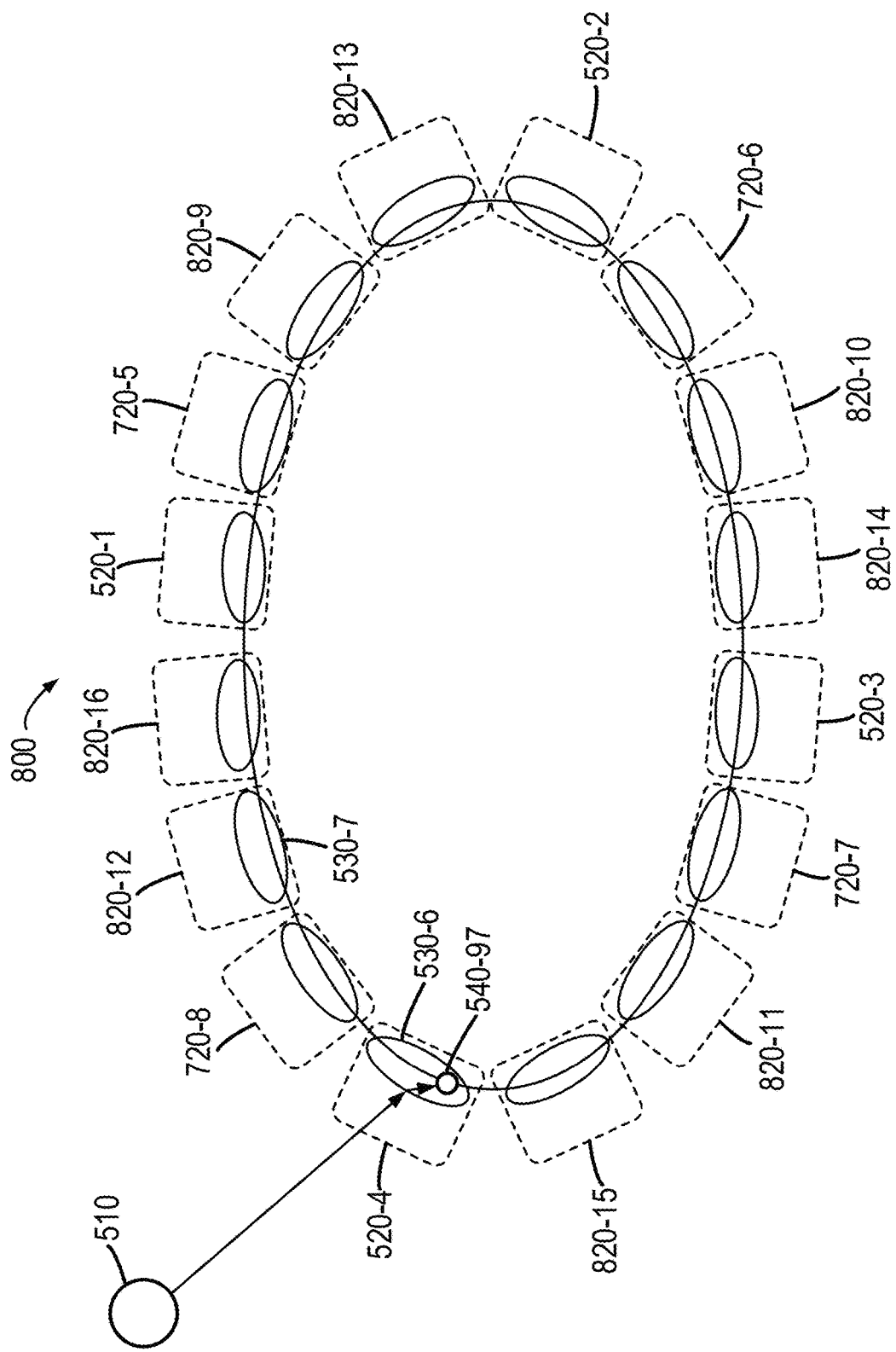
FIG. 8 shows a schematic view of a storage system solution 800 according to embodiments of the present disclosure.

According to embodiments of the present disclosure, the second implementation may be performed on the basis of FIG. 7. The storage system that has been updated through the foregoing steps may be as shown in FIG. 8. With reference to FIG. 8, there is shown a schematic view of a storage system solution 800 according to embodiments of the present disclosure, wherein the storage system solution 800 comprises 16 physical nodes and 16 sets of virtual units and is applicable to the method 600 for updating a storage system shown in FIG. 6. The storage system solution 800 as shown in FIG. 8 comprises 16 physical nodes 520-1, 520-2, 520-3, 520-4, 720-5, 720-6, 720-7 and 720-8 (which eight also exist in the storage system solution 700 shown in FIG. 7), 820-9, 820-10, 820-11, 820-12, 820-13, 820-14, 820-15 as well as 820-16. Each physical node in the storage system solution 800 comprises one set of virtual units, wherein the physical node 520-4 comprises a set of virtual units 530-6 and the physical node 820-12 comprises a set of virtual units 530-7 (in the storage system solution 500 shown in FIG. 5, the set of virtual units 530-7 is included in the physical node 520-4, and in the storage system solution 700 shown in FIG. 7, the set of virtual units 530-7 is included in 720-8). Each set of virtual units in the storage system solution 800 comprises eight virtual units, because in the storage system solution 700 each set of virtual units is split into two new sets of virtual units. Since no virtual unit is split, the storage system solution 800 as shown in FIG. 8 also comprises a total of 128 virtual units. In addition, the object 510 shown in FIG. 8 is the object associated with the storage system as shown at block 602.

It should be understood the traditional solution cannot effect expansion in the second implementation but has to split virtual units. By comparison, the second implementation according to embodiments of the present disclosure may be easily performed simply by changing the two-level hashing algorithm.

At block 604, in response to the updating event being to remove a physical node from the storage system, there also exists two implementations as below.

In the first implementation, first of all, the storage system allocates a set of virtual units on a to-be-removed physical node to a further physical node among the plurality of physical nodes based on the information.

Next, the storage system configures sets of virtual units on the further physical node, so that the object associated with the storage system is uniquely associated with one set of virtual units on the further physical node.

It should be understood regarding the storage system solution 700 according to embodiments of the present disclosure as shown in FIG. 7, when a physical node needs to be removed from the storage system so as to be restored to the storage system solution 500 shown in FIG. 5, half (four) sets of virtual units of the sets of virtual units shown in FIG. 7 may be easily re-mapped to the remaining four physical nodes.

In the second implementation, first of all, the storage system allocates a set of virtual units on a to-be-removed physical node to at least one physical node of further physical nodes among the plurality of physical nodes, so as to be combined with a set of virtual units on the at least one physical node to form a combined set of virtual units.

Next, the storage system configures sets of virtual units and the combined set of virtual units on the further physical nodes, so that the object associated with the storage system is uniquely associated with one set of virtual units or one combined set of virtual units on the further physical nodes.

It should be understood regarding the storage system solution 800 according to embodiments of the present disclosure as shown in FIG. 8, when a physical node needs to be removed from the storage system so as to be restored to the storage system solution 700 shown in FIG. 7, the sets of virtual units shown in FIG. 8 may be easily combined in pairs and further re-mapped to the remaining eight physical nodes.

It should be understood updating the storage system based on the obtained information as recorded at block 604 will involve allocating a computing resource to a new set of virtual units and recycling a computing resource from a merged set of virtual units. Those skilled in the art can obtain a clear understanding of this process from the foregoing description, which is not detailed herein.

Figure 9A:
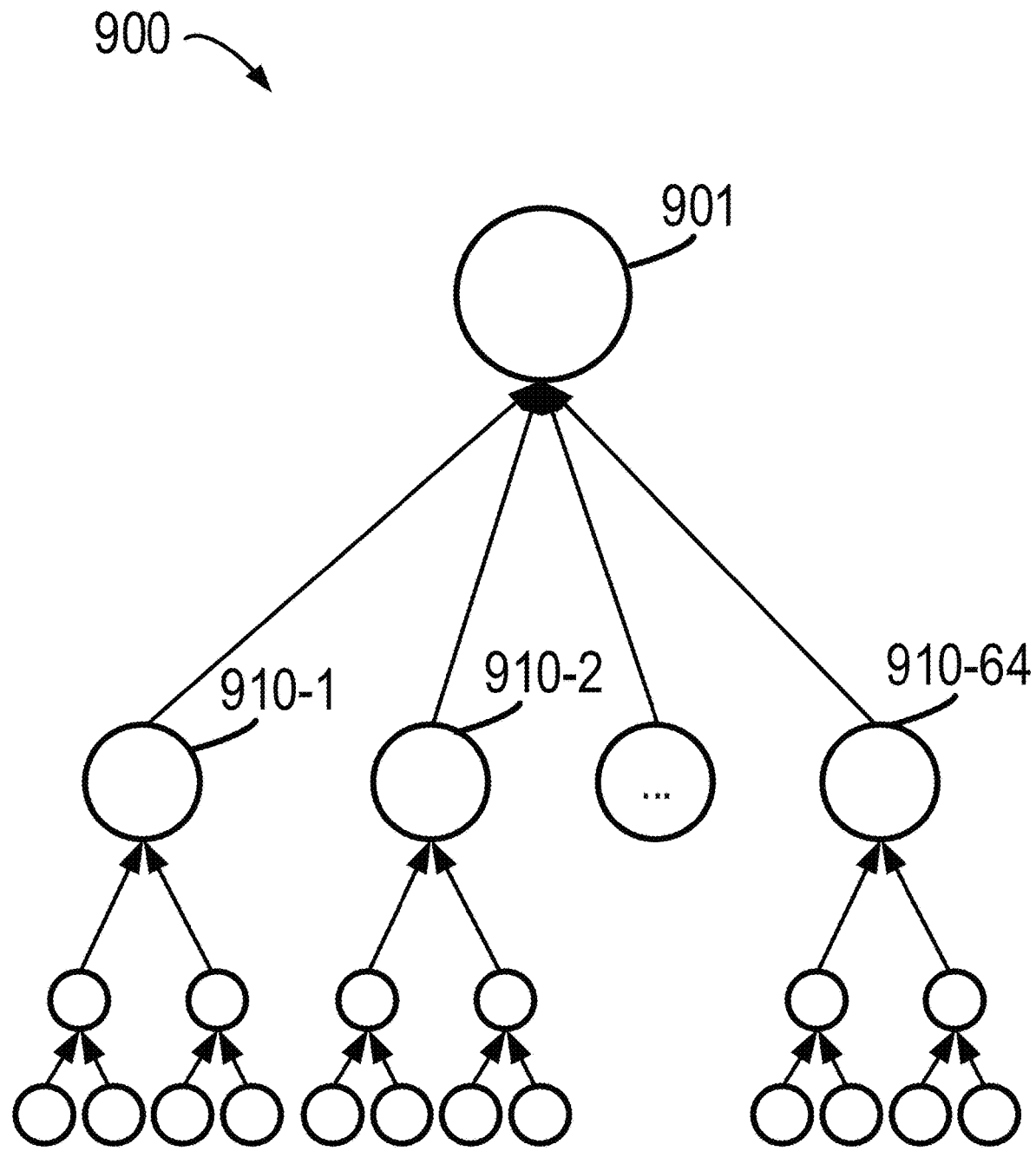
FIGS. 9A and 9B show schematic views of B+ tree implementations 900 and 950 of sets of virtual units according to embodiments of the present disclosure.
Figure 9B:
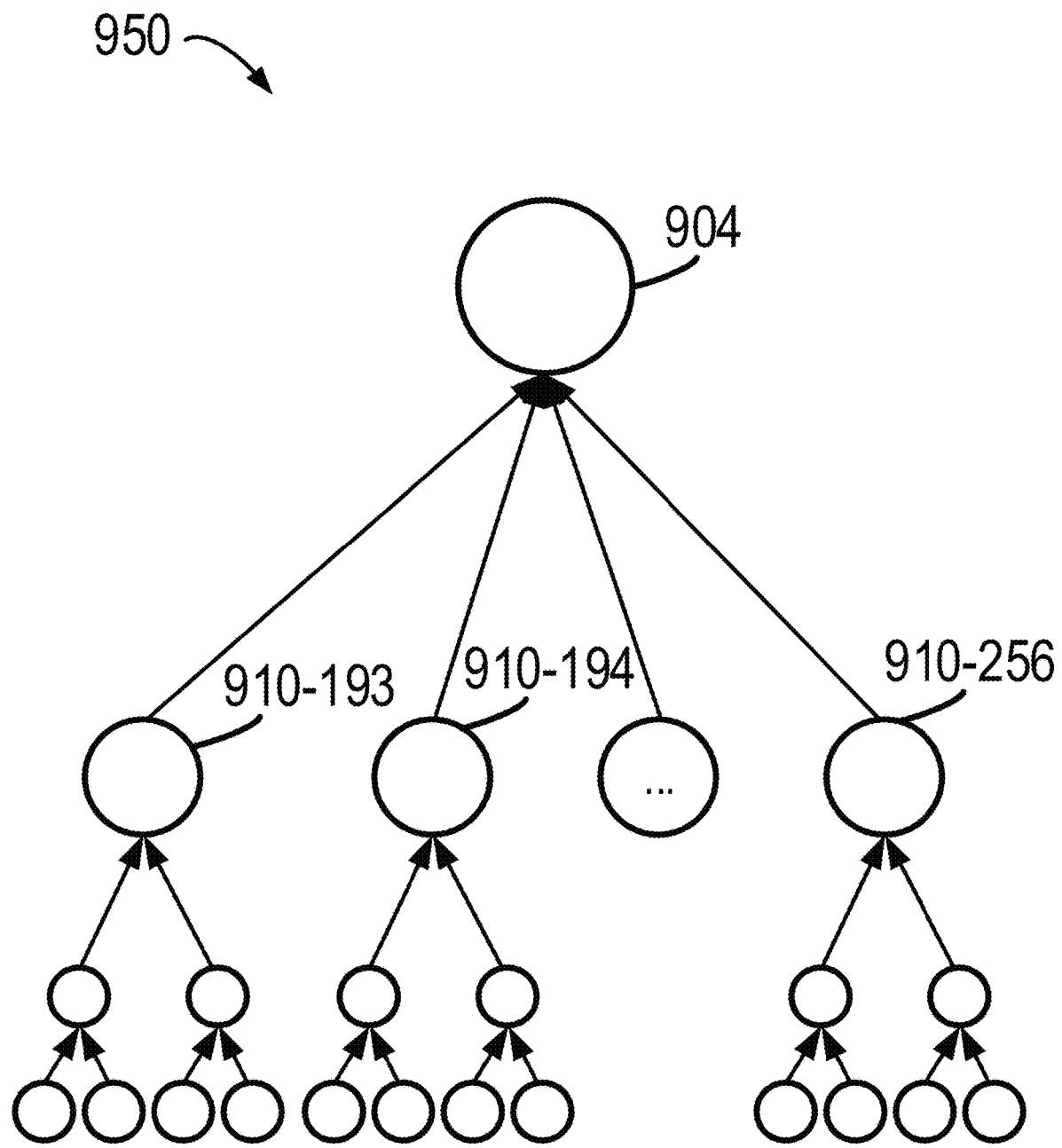

According to embodiments of the present disclosure, sets of virtual units (distributed hash table) may be implemented using a B+ tree. FIGS. 9A and 9B show B+ tree implementations 900 and 950 of sets of virtual units according to embodiments of the present disclosure respectively. However, it should be understood sets of virtual units according to embodiments of the present disclosure are not necessarily implemented by a B+ tree but may be implemented by all storage methods that can follow and implement two-level hashing.

In embodiments shown in FIGS. 9A and 9B, illustration is presented with an example that a physical node comprises four sets of virtual units. For example, FIG. 9A shows a first set of virtual units 901 included in a physical node, wherein the set of virtual units 901 comprises 64 virtual units, i.e., 910-1, 910-2 to 910-64. FIG. 9B shows a fourth set of virtual units 904 included in the physical node. For the purpose of brevity, a second and a third sets of virtual units included in the physical node are not shown. The set of virtual units 904 also comprises 64 virtual units, i.e., 910-193, 910-194 to 910-256.

In the embodiments shown in FIGS. 9A and 9B, the physical node comprises 256 virtual units by way of example. A distinctive feature of the B+ tree is that the first-level index set of virtual units is an actual root node of each virtual unit, while the root is meant to find a first-level node rather than a sorting relation of each layer. As shown in FIGS. 9A and 9B, virtual units are B+ tree structures, and each set of virtual units is a B+ tree formed by its child virtual units, wherein a first-level index page is two-level hashing rather than key sorting index, and pages lower than the first-level page are actual B+ trees. According to embodiments of the present disclosure, there may exist as many as 300 sub-trees at one node in the B+ tree. In other words, one set of virtual units may have 300 virtual units.

Figure 10:
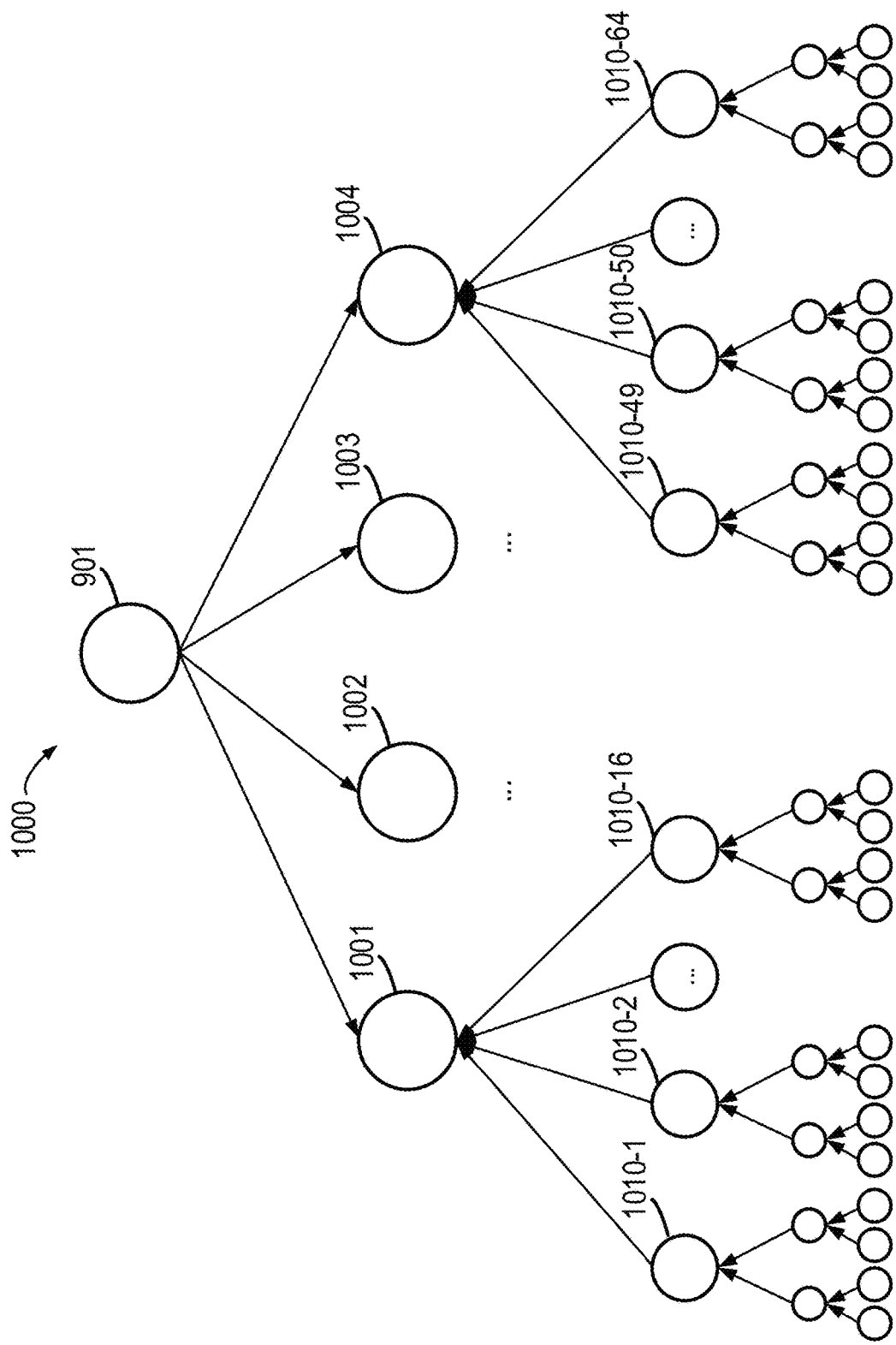
FIG. 10 shows a schematic view of a B+ tree implementation 1000 of splitting a set of virtual units according to embodiments of the present disclosure.

According to embodiments of the present disclosure, when a set of virtual units (distributed hash table) is implemented using B+ tree, the set of virtual units may also be easily split. FIG. 10 shows a schematic view of a B+ tree implementation 1000 of splitting a set of virtual units according to embodiments of the present disclosure.

FIG. 10 shows a B+ tree structure after splitting the set of virtual units 901 as shown in FIG. 9A into four new sets of virtual units 1001, 1002, 1003 and 1004. As depicted, since the set of virtual units 901 comprises 64 virtual units, the new sets of virtual units 1001, 1002, 1003 and 1004 each comprise 16 virtual units, wherein the new set of virtual units 1001 comprises virtual units 1010-1, 1010-2 to 1010-16, and the new set of virtual units 1004 comprises virtual units 1010-49, 1010-50 to 1010-64. It can be seen the new sets of virtual units 1001, 1002, 1003 and 1004 that result from splitting the set of virtual units 901 are also in the form of B+trees.

It should be understood by means of B+ trees, sets of virtual units may also be easily merged.

It should be understood the respective numbers of physical nodes, virtual units and sets of virtual units as mentioned in the figures are merely for the example purpose and not intended to limit the protection scope of the present disclosure. These numbers may be set randomly according to needs, and in the same storage system, it is not required each physical node comprises a same number of sets of virtual units or each set of virtual units comprises a same number of virtual units.

The flows of the method 400 for processing an access request and the method 600 for updating a storage system have been described with reference to FIGS. 4 to 10. It should be understood the foregoing description is to better present content of the present disclosure rather than limiting in any manner.

As seen from the description with reference to FIGS. 1 to 10, the technical solution according to embodiments of the present disclosure has many advantages over the traditional solution. First of all, the technical solution according to embodiments of the present disclosure may only require a small number of sets of virtual units during storage system building; since computing resources are only allocated to sets of virtual units, the storage system can be built by allocating much fewer computing resources to physical nodes. In addition, in the technical solution according to embodiments of the present disclosure, a set of virtual units comprising a plurality of virtual units may be easily split and merged, and this may be implemented only by adjusting the first level or the second level in the two-level hashing algorithm without data scanning and storage over the whole disk. Moreover, the technical solution according to embodiments of the present disclosure may be easily performed using B+ trees, and more sets of virtual units and virtual units may be included in the storage system with less resources.

Figure 11:
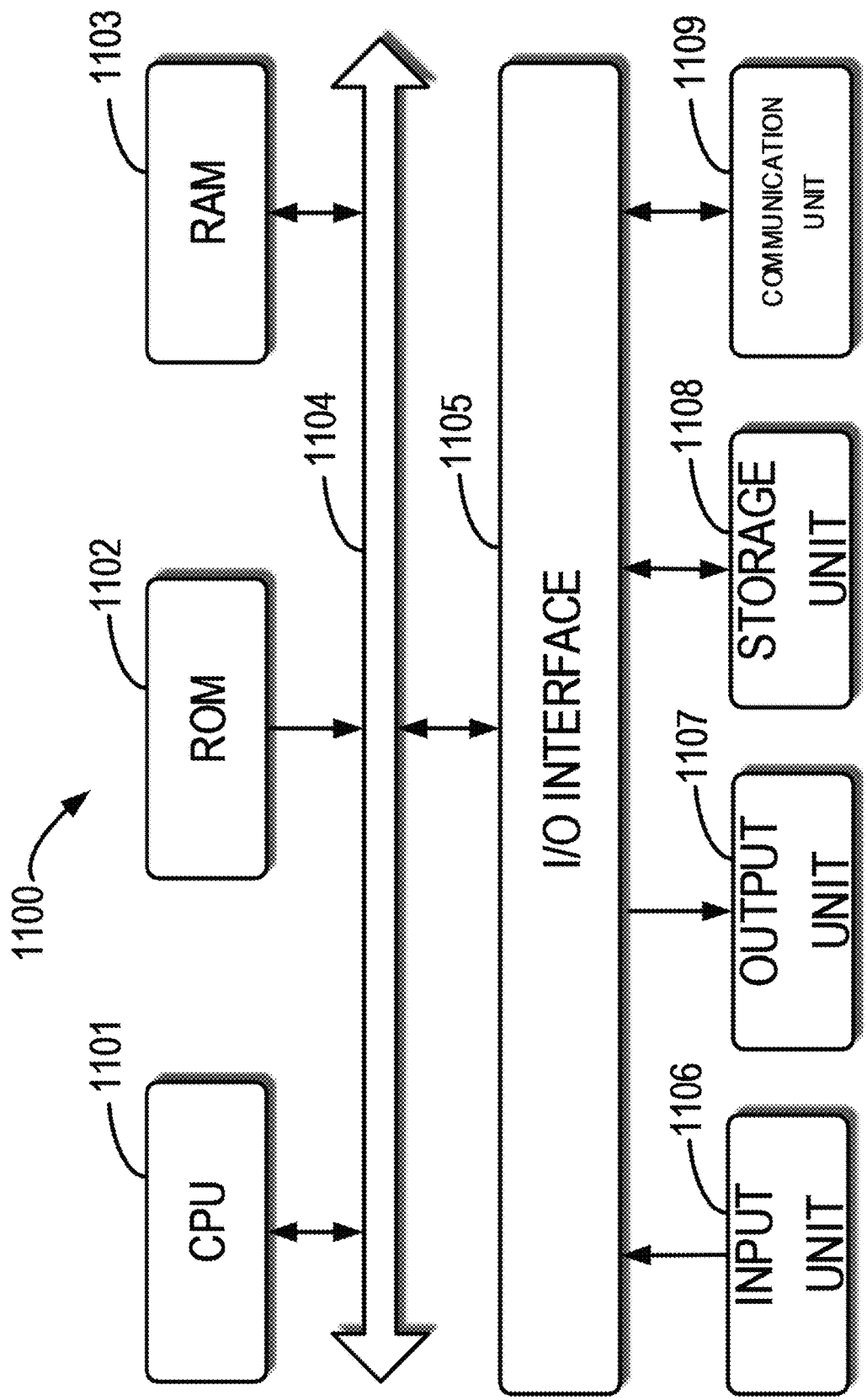
FIG. 11 shows a schematic block diagram of an example device 1100 which is applicable to implement embodiments of the present disclosure.

FIG. 11 shows a schematic block diagram of an example device 1100 suitable for implementing embodiments of the present disclosure. As depicted, the device 1100 comprises a central processing unit (CPU) 1101 which is capable of performing various appropriate actions and processes in accordance with computer program instructions stored in a read only memory (ROM) 1102 or computer program instructions loaded from a storage unit 1108 to a random access memory (RAM) 1103. In the RAM 1103, there are also stored various programs and data required by the device 1100 when operating. The CPU 1101, the ROM 1102 and the RAM 1103 are connected to one another via a bus 1104. An input/output (I/O) interface 1105 is also connected to the bus 1104.

A plurality of components in the device 1100 are connected to the I/O interface 1105: an input unit 1106 including a keyboard, a mouse, or the like; an output unit 1107, such as various types of displays, a loudspeaker or the like; a storage unit 1108, such as a disk, an optical disk or the like; and a communication unit 1109, such as a LAN card, a modem, a wireless communication transceiver or the like. The communication unit 1109 allows the device 1100 to exchange information/data with other device via a computer network, such as the Internet, and/or various telecommunication networks.

The above-described procedures and processes (such as the methods 400 and 600) may be executed by the processing unit 1101. For example, in some embodiments, the methods 400 and 600 may be implemented as a computer software program, which is tangibly embodied on a machine readable medium, e.g., the storage unit 1108. In some embodiments, part or the entirety of the computer program may be loaded to and/or installed on the device 1100 via the ROM 1102 and/or the communication unit 1109. The computer program, when loaded to the RAM 1103 and executed by the CPU 1101, may execute one or more acts of the methods 400 and 600 as described above.

The present disclosure may be a method, an apparatus, a system, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to embodiments disclosed. Many modifications and variations will be apparent to those of ordinary skill in the art without departing from the scope and spirit of the described embodiments. The terminology used herein was chosen to best explain the principles of embodiments, the practical application or technical improvement over technologies found in the marketplace, or to enable others of ordinary skill in the art to understand embodiments disclosed herein.

What is claimed is:

1. A system, comprising:
a processor; and
a memory that stores executable instructions that, when executed by the processor, facilitate performance of operations, comprising:
storing an object in a storage system that comprises physical nodes, wherein the physical nodes store respective groups of virtual units;
determining a first hash from a first identifier of the object that identifies a target group of virtual units of the respective groups of virtual units associated with the object;
determining a second hash from the first identifier of the object and a second identifier of the target group of virtual units that identifies a target virtual unit of the target group of virtual units; and
in response to detecting an update event associated with the storage system, determining an updated first hash that identifies the target group of virtual units, wherein the second hash is unalterable and is used to identify the target virtual unit of the target group of virtual units.

2. The system of claim 1, wherein the operations further comprise:
in response to the update event comprising adding an additional physical node to the storage system,
allocating at least one group of virtual units of the respective groups of virtual units to the additional physical node; and
uniquely associating the object with a group of virtual units of the at least one group of virtual units.

3. The system of claim 1, wherein the operations further comprise:
in response to the update event comprising adding an additional physical node to the storage system,
splitting a group of virtual units of the respective groups of virtual units in the physical nodes into a first new group of virtual units and a second new group of virtual units;
allocating, to the additional physical node, the first new group of virtual units; and
uniquely associating the object with the group of virtual units of the respective groups of virtual units, the first new group of virtual units, or the second new group of virtual units.

4. The system of claim 3, wherein the operations further comprise:
performing the splitting based on determining that adding the additional physical node to the storage system results in a first number of physical nodes of the storage system being greater than a second number of groups of virtual units of the storage system.

5. The system of claim 1, wherein the operations further comprise:
in response to the update event comprising removing a physical node from the storage system,
allocating a first group of virtual units in the physical node to be removed to other physical nodes of the physical nodes other than the physical node; and
uniquely associating the object with a second group of virtual units in the other physical nodes.

6. The system of claim 1, wherein the operations further comprise:
in response to the update event comprising removing a physical node from the storage system,
allocating a first group of virtual units in the physical node to be removed to at least one physical node of other physical nodes of the physical nodes, other than the physical node, in order to be combined with a second group of virtual units in the at least one physical node, to form a combined groups of virtual units; and
uniquely associating the object with a group of virtual units in the other physical nodes or the combined groups of virtual units.

7. The system of claim 6, wherein the operations further comprise:
forming the combined groups of virtual units based on determining that removing the physical node from the storage system results in a first number of physical nodes of the storage system being less than or equal to a second number of groups of virtual units of the storage system.

8. A method, comprising:
storing, by a system comprising a processor, an object in a storage system that comprises physical nodes, wherein the physical nodes store respective groups of virtual units of groups of virtual units, wherein a target group of virtual units of the respective groups of virtual units associated with the object is determined based on performing a first hash on a first identifier of the object, and wherein a target virtual unit of the target group of virtual units associated with the object is determined based on performing a second hash on the first identifier of the object and a second identifier of the target group of virtual units; and in response to detecting an update event associated with the storage system, determining, by the system, an updated first hash that identifies the target group of virtual units, wherein the second hash is unalterable and is used to identify the target virtual unit of the target group of virtual units.

9. The method of claim 8, further comprising:

in response to the update event being to add an additional physical node to the storage system, allocating, by the system, at least one group of virtual units in the physical nodes to the additional physical node such that each physical node of the physical nodes and the additional physical node includes the at least one group of virtual units; and configuring, by the system, the respective groups of virtual units in the physical nodes and the additional physical node such that the object is uniquely associated with one group of virtual units in the physical nodes or the additional physical node.

10. The method of claim 8, further comprising:

in response to the update event being to add an additional physical node to the storage system, splitting, by the system, one group of virtual units in the physical nodes into new groups of virtual units;

allocating, by the system and to the additional physical node, at least one new group of virtual units such that each physical node of the physical nodes or the additional physical node includes at least one group of an unsplit group of virtual units and a new group of virtual units; and configuring, by the system, the unsplit group of virtual units in the physical nodes and the additional physical node and the new groups of virtual units such that the object is uniquely associated with one unsplit group of virtual units or one new group of virtual units in the physical nodes and the additional physical node.

11. The method of claim 10, further comprising:

performing the splitting of one group of virtual units in the physical nodes into the new groups of virtual units based on determining, by the system, that adding to the storage system results in a first number of physical nodes of the storage system being greater than a second number of groups of virtual units of the storage system.

12. The method of claim 8, further comprising:

in response to the update event being to remove a physical node from the storage system, allocating, by the system, a group of virtual units in the physical node to be removed to other physical nodes of the physical nodes; and configuring, by the system, the other physical nodes such that the object is uniquely associated with one group of virtual units in the other physical nodes.

13. The method of claim 8, further comprising:

in response to the update event being to remove a physical node from the storage system, allocating, by the system, a first group of virtual units in the physical node to be removed to at least one physical node of other physical nodes of the physical nodes so as to be combined with a second group of virtual units in the at least one physical node, to form a combined groups of virtual units; and configuring, by the system, the other physical nodes and the combined group of virtual units such that the object is uniquely associated with one group of virtual units in the other physical nodes or the combined groups of virtual units.

14. The method of claim 13, further comprising:

forming, by the system, the combined groups of virtual units based on determining that removing the physical node from the storage system results in a first number of physical nodes of the storage system being less than or equal to a second number of groups of virtual units of the storage system.

15. A non-transitory computer-readable medium comprising instructions that, in response to execution, cause a system comprising a processor to perform operations, comprising:

storing an object in a storage system that comprises a group of physical nodes, wherein respective physical nodes of the group of physical nodes store respective groups of virtual units of groups of virtual units, wherein a first hash from a first identifier of the object identifies a target group of virtual units of the respective groups of virtual units associated with the object, and wherein a second hash from the first identifier of the object and a second identifier of the target group of virtual units identifies a target virtual unit of the target group of virtual units; and in response to detecting an update event associated with the storage system, determining an updated first hash that identifies the target group of virtual units, wherein the second hash is unalterable and is used to identify the target virtual unit of the target group of virtual units.

16. The non-transitory computer-readable medium of claim 15, wherein the update event comprises adding an additional physical node to the storage system, and wherein the operations further comprise:

allocating at least one group of virtual units to the additional physical node; and uniquely associating the object with one group of virtual units.

17. The non-transitory computer-readable medium of claim 15, wherein the update event comprises adding an additional physical node to the storage system, and wherein the operations further comprise:

splitting one group of virtual units in the group of physical nodes into a first new group of virtual units and a second new group of virtual units;

allocating, to the additional physical node, the first new group of virtual units; and uniquely associating the object with one group of virtual units of the respective groups of virtual units, the first new group of virtual units, or the second new group of virtual units.

18. The non-transitory computer-readable medium of claim 17, wherein the operations further comprise:

performing the splitting based on determining that adding the additional physical node to the storage system results in a first number of physical nodes of the storage system being greater than a second number of groups of virtual units of the storage system.

19. The non-transitory computer-readable medium of claim 15, wherein the update event comprises removing a physical node from the storage system, and wherein the operations further comprise:

allocating a group of virtual units in the physical node to be removed to other physical nodes of the group of physical nodes; and uniquely associating the object with one group of virtual units in the other physical nodes.

20. The non-transitory computer-readable medium of claim 15, wherein the update event comprises removing a physical node from the storage system, and wherein the operations further comprise:
- allocating a first group of virtual units in the physical node to be removed to at least one physical node of other physical nodes of the group of physical nodes so as to be combined with a second group of virtual units in the at least one physical node, to form a combined groups of virtual units; and
- uniquely associating the object with one group of virtual units in the other physical nodes or the combined groups of virtual units.

* * * * *